(12) United States Patent
Moon

(10) Patent No.: US 7,058,037 B1
(45) Date of Patent: Jun. 6, 2006

(54) RADIO FREQUENCY TRANSMITTING DEVICE OF MOBILE RADIO COMMUNICATION BASE STATION SYSTEM IN CODE DIVISION MULTIPLE ACCESS SYSTEM

(75) Inventor: Sung Bae Moon, Kyungki-Do (KR)

(73) Assignee: UTStarcom, Inc., Alameda, CA (US)

( * ) Notice: Subject to any disclaimer, the term of this patent is extended or adjusted under 35 U.S.C. 154(b) by 827 days.

(21) Appl. No.: 09/658,696

(22) Filed: Sep. 8, 2000

(30) Foreign Application Priority Data

Sep. 13, 1999 (KR) ............................... 1999-39093

(51) Int. Cl.
*H04B 7/216* (2006.01)
(52) U.S. Cl. ...................................... 370/335; 370/341
(58) Field of Classification Search ................ 370/342, 370/331, 335, 318; 455/561
See application file for complete search history.

(56) References Cited

U.S. PATENT DOCUMENTS

| | | | | |
|---|---|---|---|---|
| 5,625,623 A | | 4/1997 | Kent et al. .................. 370/280 |
| 5,657,374 A | | 8/1997 | Russell et al. ............... 370/328 |
| 5,838,732 A | * | 11/1998 | Carney ......................... 375/297 |
| 5,930,301 A | * | 7/1999 | Chester et al. ............... 375/296 |
| 6,046,992 A | | 4/2000 | Meier et al. ................. 370/338 |
| 6,052,378 A | * | 4/2000 | Park ............................. 370/441 |
| 6,208,844 B1 | * | 3/2001 | Abdelgany .................... 455/82 |
| 6,216,004 B1 | * | 4/2001 | Tiedemann et al. ......... 455/442 |
| 6,268,818 B1 | * | 7/2001 | Xin et al. ..................... 341/152 |
| 6,286,994 B1 | * | 9/2001 | Boesel et al. ................ 374/146 |
| 6,292,652 B1 | * | 9/2001 | Kim ............................. 455/20 |
| 6,370,109 B1 | * | 4/2002 | Schwartz et al. ............ 370/203 |
| 6,430,169 B1 | * | 8/2002 | Harms et al. ................ 370/335 |
| 6,473,133 B1 | * | 10/2002 | Twitchell et al. ............ 348/608 |
| 6,473,416 B1 | * | 10/2002 | Lee .............................. 370/342 |
| 6,483,817 B1 | * | 11/2002 | Antonio et al. .............. 370/328 |
| 6,519,456 B1 | * | 2/2003 | Antonio et al. .............. 455/442 |
| 2003/0214926 A1 | * | 11/2003 | Choi et al. ................... 370/335 |

* cited by examiner

*Primary Examiner*—Steven Nguyen
*Assistant Examiner*—Clemence Han
(74) *Attorney, Agent, or Firm*—McDonnell Boehnen Hulbert & Berghoff LLP (57) ABSTRACT

Disclosed is an RF transmitting device of a mobile radio communication base station system in a CDMA system capable of digital-modulating baseband signals which are converted into band spread signals by using the same path which three frequency assignment frequency signals have for an RF in a multi-carrier mobile radio communication system supporting three frequency assignment, digital-coupling the modulated signals, and up-converting the digital-coupled signal into an IF signal and an RF signal in a sequential order, thereby transmitting the up-converted signal.

8 Claims, 7 Drawing Sheets

RADIO FREQUENCY TRANSMITTING DEVICE OF MOBILE RADIO COMMUNICATION BASE STATION SYSTEM IN CODE DIVISION MULTIPLE ACCESS SYSTEM

BACKGROUND OF THE INVENTION

1. Field of the Invention

The present invention relates to a radio frequency (hereinafter, referred to simply as RF) transmitting device of a mobile radio communication base station system in a code division multiple access system (hereinafter, referred to simply as CDMA) and more particularly, to an RF transmitting device of a mobile radio communication base station system in a CDMA system which is capable of digital-modulating baseband signals which are converted into band spread signals by using the same path which three frequency assignment frequency signals have for an RF in a multi-carrier mobile radio communication system supporting three frequency assignment, digital-coupling the modulated signals, and up-converting the digital-coupled signal into an intermediate frequency signal and an RF signal in a sequential order, thereby transmitting the up-converted signal.

2. Discussion of Related Art

A general mobile radio communication base station system in a CDMA system includes a switching system and a cell equipment. Of course, the above system contains a large number of functional devices which are all embodied with various kinds of equipments.

The key part of the mobile radio communication base station system is composed of a channel card, a sector interface card, an analog common card and a digital shelf on which a terminal card is packaged. Additionally, it contains a tranceiver shelf which up-converts an IF signal outputted from the digital shelf in an ultra high frequency (UHF) signal and reversely, down-converts the UHF signal into the IF signal. In the tranceiver shelf the sector interface card is installed to couple baseband forward signals received from the channel cards and up-convert the coupled signal into the IF signal. The sector interface card receives the coupled baseband transmitting signals coupled from the analog common cards and couples and amplifies the received signals. The coupled signal is coupled, through a low-pass filter (LPF), to the IF signal, i.e., the delayed signal by the phase of 0° and 90° of 4.95 MHz and transmitted as the IF signal of 4.95 MHz, through a band-pass filter (BPF), to an RF rack. Therefore, the RF rack converts the received IF signal of 4.95 MHz into the UHF signal, for transmitting the converted signal through an antenna.

Figure 1:
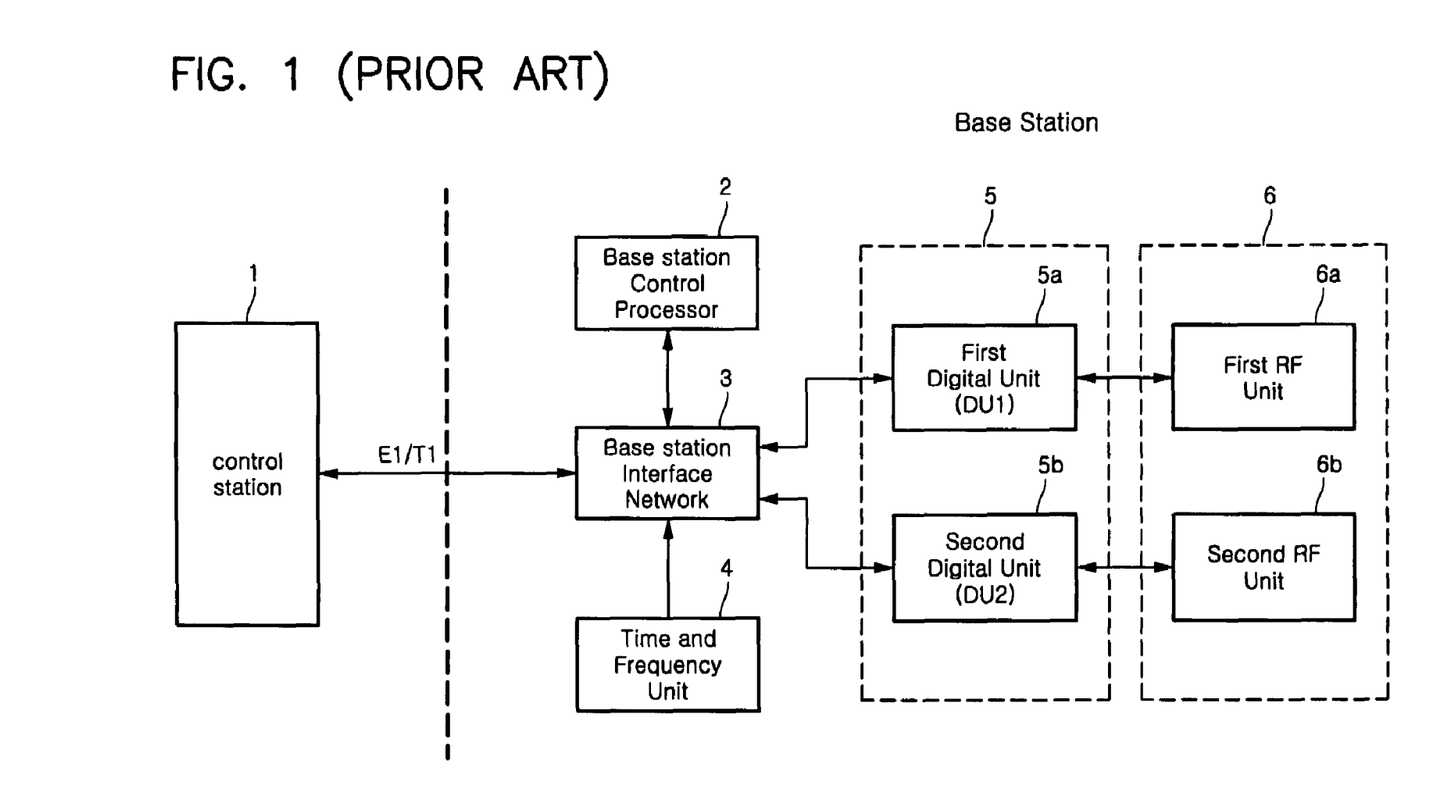
FIG. 1 is a block diagram illustrating the construction of a general mobile radio communication base station system.
Figure 2:
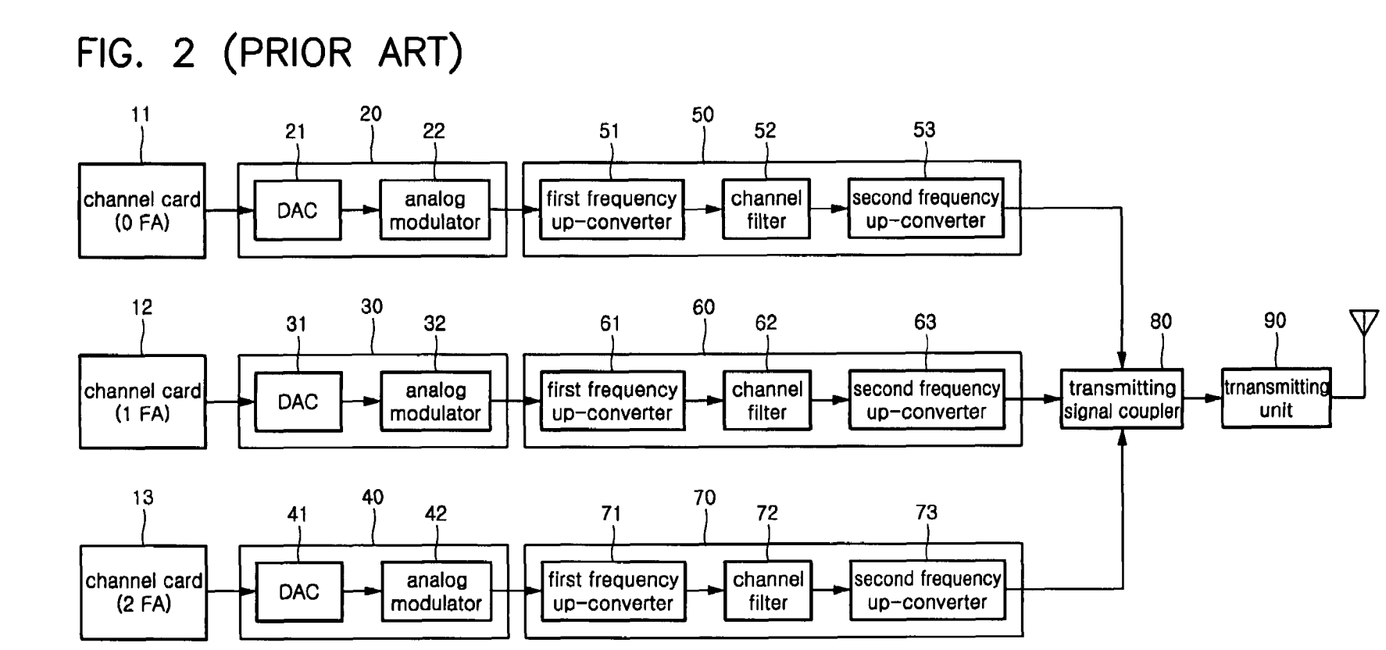
FIG. 2 is a block diagram illustrating the construction of a prior art RF transmitting device of a mobile radio communication base station system in a CDMA system.

Referring to FIGS. 1 and 2, now, an explanation of the construction and operation of the general mobile radio communication base station system will be discussed.

FIG. 1 is a block diagram illustrating the construction of a general mobile radio communication base station system. In construction, referring to FIG. 2, the system comprises: a base station control processor (BCP) 2 which operates and controls one base station; a base station interconnection network (BIN) 3 which serves as a packet router between the base station and a control station 1 via a line E1 or T1 and interfaces high-level data link control (HDLC) packet data between the processors within the base station; a time and frequency unit (TFU) 4 which generates a reference frequency and a timing synchronizing signal to thereby execute the synchronization for each processor within the base station and the timing synchronization with an adjacent base station; a digital unit (DU) 5 composed of a first digital unit 5a and a second digital unit 5b, which modulates/demodulates the data signal and voice signal transmitted/received through a CDMA channel; and an RF unit (RFU) 6 composed of a first RF unit 6a and a second RF unit 6b, which converts an UHF signal received from a mobile station into an IF signal to thereby transmit the converted IF signal to the digital unit 5, receives the IF signal inputted from the digital unit 5 to thereby convert the received IF signal into the UHF signal, and amplifies the converted UHF signal to a predetermined level to thereby execute space-radiation for the amplified UHF signal. The RF unit 6 is divided into an RF receiving device and an RF transmitting device.

FIG. 2 is a block diagram illustrating a prior art RF transmitting device of a digital mobile radio communication base station system in a CDMA system.

As shown, the conventional RF transmitting device comprises: three channel cards 11, 12 and 13 which output digital baseband signals for supporting three frequency assignment to I/Q (in-phase/quadrature) channels by each frequency assignment; three analog processors 20, 30 and 40 which are correspondingly connected to the channel cards 11, 12 and 13, convert the baseband signals on the I/Q channels by each frequency assignment into analog signals, and execute a quadrature phase shifting keying (QPSK) modulation for each of the converted analog baseband signals to thereby output the modulated signal; three analog up-converters 50, 60 and 70 which are correspondingly connected to the three analog processors 20, 30 and 40, convert the modulated signals by each frequency assignment outputted from the three analog processors 20, 30 and 40 into IF signals, and convert the converted IF signals into transmitting frequency (RF) signals to thereby output the converted RF signals; a transmitting signal coupler 80 which couples the RF signals by the frequency assignment outputted from the three analog up-converters 50, 60 and 70 and outputs the coupled signal on a single path, and a transmitting unit 90 which amplifies the RF signal outputted from the transmitting signal coupler 80 to a predetermined level, limits the frequency band of the RF signal to prevent the affect on the frequency used in another communication system and transmits the band-limited RF signal via an antenna. In this case, the baseband signals, which are outputted from the three channel cards 11, 12 and 13, that is, the channel cards by the frequency assignment are 0FA-I, 0FA-Q, 1FA-I, 1FA-Q, 2FA-I and 2FA-Q.

The three analog processors 20, 30 and 40 by the frequency assignment 0FA, 1FA and 2FA include D/A converters 21, 31 and 41 for converting the baseband signals outputted from the channel cards 11, 12 and 13 into the analog signals and analog modulators 22, 32 and 42 for executing the QPSK modulation for the analog baseband signals outputted from the D/A converters 21, 31 and 41 to thereby up-convert the modulated signal into a frequency signal of 4.95 MHz. Each of the three analog up-converters 50, 60 and 70 by the frequency assignment contains local oscillators and mixers (which are not shown in the drawing). And, the three analog up-converters 50, 60 and 70 by the frequency assignment comprise: first frequency up-converters 51, 61 and 71 for up-converting the frequency signals of 4.95 MHz outputted from the analog modulators 22, 32 and 42 into the IF signals by using the corresponding local oscillator and mixer; channel filters 52, 62 and 72 for filtering the IF signals outputted from the first frequency up-converters 51, 61 and 71 with a frequency bandwidth of 1.25 MHz to thereby output the filtered signals; and second frequency up-converters 53, 63 and 73 for up-converting the filtered signals in the channel filters 52, 62 and 72 into the RF signal by using the corresponding local oscillator and mixer. In this case, the local oscillator in each of the second frequency up-converters 53, 63 and 73 is, preferably, a variable local oscillator for channel division.

Under the above construction, an explanation of the operation of the conventional RF transmitting device will be discussed.

First, the channel cards 11, 12 and 13 by each frequency assignment output the CDMA digital signals to the D/A converters 21, 31 and 41 of the analog processors 20, 30 and 40 through the I/Q channels by each frequency assignment 0FA-I, 0FA-Q, 1FA-I, 1FA-Q, 2FA-I and 2FA-Q. At this time, the output signals are the baseband signals. The baseband signals on the I/Q channels outputted from the channel cards 11, 12 and 13 are converted into the analog signal by means of the D/A converters 21, 31 and 41 and then outputted to the analog modulators 22, 32 and 42. The QPSK modulation on the I/Q channels for the analog baseband signals outputted from the D/A converters 21, 31 and 41 is executed in the analog modulators 22, 32 and 42, respectively. Then, the signals on the I/Q channels by each frequency assignment are coupled and transmitted to the first frequency up-converters 51, 61 and 71 of the analog frequency up-converters 50, 60 and 70. At this time, the baseband signals are up-converted into the frequency signal of 4.95 MHz. The first frequency up-converters 51, 61 and 71 of the analog frequency up-converters 50, 60 and 70 convert the signals which are made by coupling the signals on the I/Q channels into the IF signal by using the local oscillator and mixer and transmit the converted IF signals to the channel filters 52, 62 and 72. In other words, the coupled signal on the I/Q channels and the local frequency generated from the local oscillator are mixed by means of the mixer and then converted into the IF signal. The converted IF signals, from which the signals being out of the frequency band by each frequency assignment are filtered by means of the channel filters 52, 62 and 72 to thereby protect the transmitting signals thereof, are outputted to the second frequency up-converters 53, 63 and 73. At this time, the channel filters 52, 62 and 72 are, preferably, a surface acoustic wave (SAW) filter having the bandwidth of 1.25 MHz. Next, the second frequency up-converters 53, 63 and 73 convert the IF signals outputted from the channel filters 52, 62 and 72 into the RF signals by using the local oscillator and output the converted RF signals by the frequency assignment to the transmitting signal coupler 80. At this time, the local oscillator, which is used in the second frequency up-converters 53, 63 and 73, respectively, is a variable local oscillator for channel division. Therefore, the signal of each local oscillator is generated at the frequency intervals of each frequency assignment. The three frequency assignment signals, which have been converted into the RF signals, are coupled in the transmitting signal coupler 80 and outputted to the transmitting unit 90. Finally, the transmitting unit 90 amplifies the coupled RF signal outputted from the transmitting signal coupler 80 to the predetermined level via a low-power amplifier (which is omitted in the drawing), limits the frequency band of the RF signal to prevent the affect on the frequency used in another communication system and transmits the RF signal via the antenna.

However, the conventional RF transmitting device of the mobile radio communication base station system in the CDMA system suffers from problems that the production cost increases, because the hardware for converting the baseband signal into the RF signal is constructed separately by each frequency assignment, that the size of system is bulky, because the construction is complicated, and that the stability of system to temperature and time becomes deteriorated, because the process for up-converting the baseband signal into the IF signal is carried out in an analog manner. Additionally, the conventional RF transmitting device suffers from problems that it is difficult to extend the frequency assignment, the hardware configuration is complicated, and that the expense increases, because the frequency up-converting process is carried out by each frequency assignment and the extension of the frequency assignment is made each frequency assignment.

SUMMARY OF THE INVENTION

An object of the invention is to provide an RF transmitting device of a mobile radio communication base station system in a CDMA system which is capable of digital-modulating baseband signals which are converted into band spread signals by using the same path which three frequency assignment frequency signals have for an RF in a multi-carrier mobile radio communication system supporting three frequency assignment, digital-coupling the modulated signals, and up-converting the digital-coupled signal into an IF signal and an RF signal in a sequential order, thereby transmitting the up-converted signal.

According to an aspect of the present invention, there is provided an RF transmitting device of a mobile radio communication base station system in a CDMA system having a plurality of channel cards providing baseband signals on I/Q channels for multi-frequency assignment and a transmitting antenna, which comprises: a digital unit for digital-modulating the baseband signals on the I/Q channels by each frequency assignment provided from the plurality of channel cards, coupling the digital modulated signals by the frequency assignment, and then converting the coupled multi-frequency assignment digital modulated signal into an analog signal; an analog frequency up-converting unit for primarily up-converting the analog-converted multi-frequency assignment signal in the digital unit into an IF signal and secondarily up-converting the converted IF signal into an RF signal; and a transmitting unit for amplifying the secondarily up-converted RF signal to an arbitrary transmitting output level and transmitting the amplified signal via the transmitting antenna.

According to another aspect of the present invention, there is provided an RF transmitting device of a mobile radio communication base station system having a plurality of channel cards providing baseband signals on I/Q channels for multi-frequency assignment and a transmitting antenna, which comprises: a plurality of digital modulators for executing a QPSK modulation by each frequency assignment for a CDMA baseband signal outputted by each of the plurality of channel cards and for executing a serial coupling of the QPSK modulated signal in a most significant frequency assignment or a least significant frequency assignment with the QSPK modulated signal in more significant frequency assignment or less significant frequency assignment in a sequential order, to thereby output a digital modulated signal in a multi-frequency assignment band; a D/A converter for converting the coupled multi-frequency assignment QPSK modulated signal outputted from the most significant frequency assignment or the least significant frequency assignment digital modulator into an analog signal to thereby output the converted analog signal to an analog frequency up-converting unit; the analog frequency up-converting unit comprising a first frequency up-converter for up-converting the coupled multi-frequency assignment analog signal outputted from the D/A converter into an arbitrary IF signal, a band-pass filter for band-pass filtering the coupled multi-frequency assignment IF signal outputted from the first frequency up-converter to an arbitrary bandwidth, and a second frequency up-converter for converting the multi-frequency assignment IF signal filtered in the band-pass filter into an RF signal to thereby output the converted RF signal to a transmitting unit; and the transmitting unit for amplifying the secondarily up-converted RF signal in the analog frequency up-converting unit to an arbitrary transmitting output level and transmitting the amplified signal via the transmitting antenna.

DETAILED DESCRIPTION OF PREFERRED EMBODIMENT

Hereinafter, an explanation of the construction and operation of an RF transmitting device of a mobile radio communication base station system in a CDMA system according to first and second embodiments of the present invention will be in detail discussed with reference to FIGS. 3 to 7. On the other hand, an explanation of the same components as in the prior art of FIG. 2 will be omitted for the brevity of the description.

First Embodiment

Figure 3:
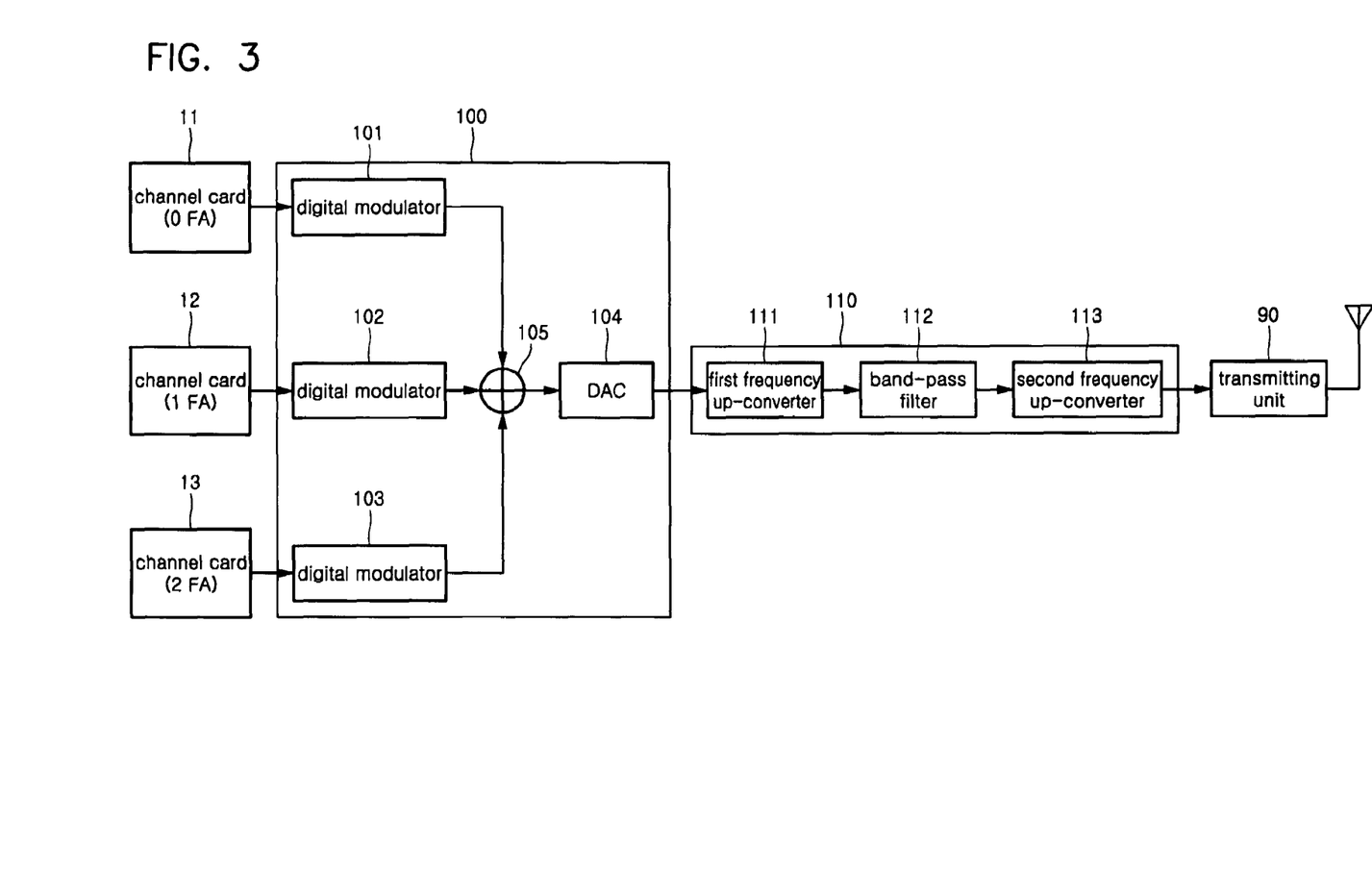
FIG. 3 is a block diagram illustrating an RF transmitting device of a mobile radio communication base station system in a CDMA system according to a first embodiment of the present invention.
Figure 4:
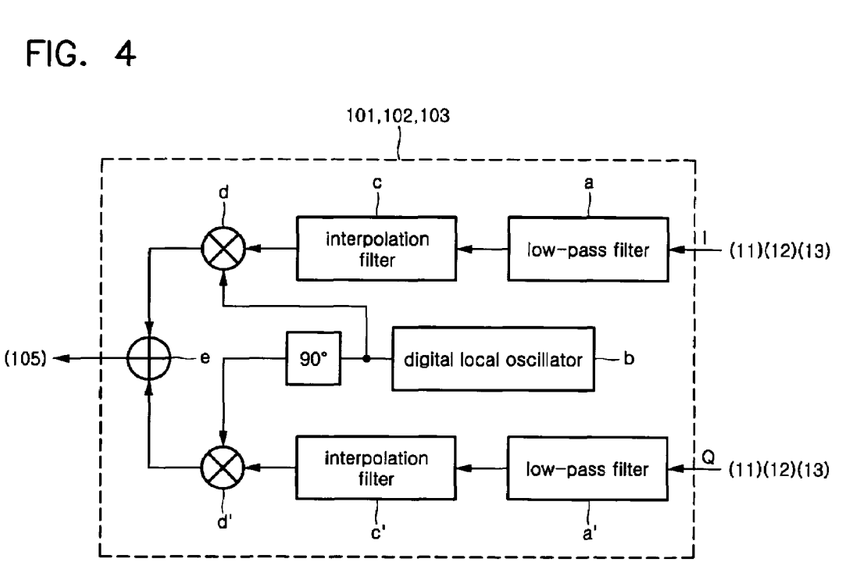
FIG. 4 is an exemplary view illustrating the preferred embodiment of the plurality of digital modulators in FIG. 3.
Figure 5:
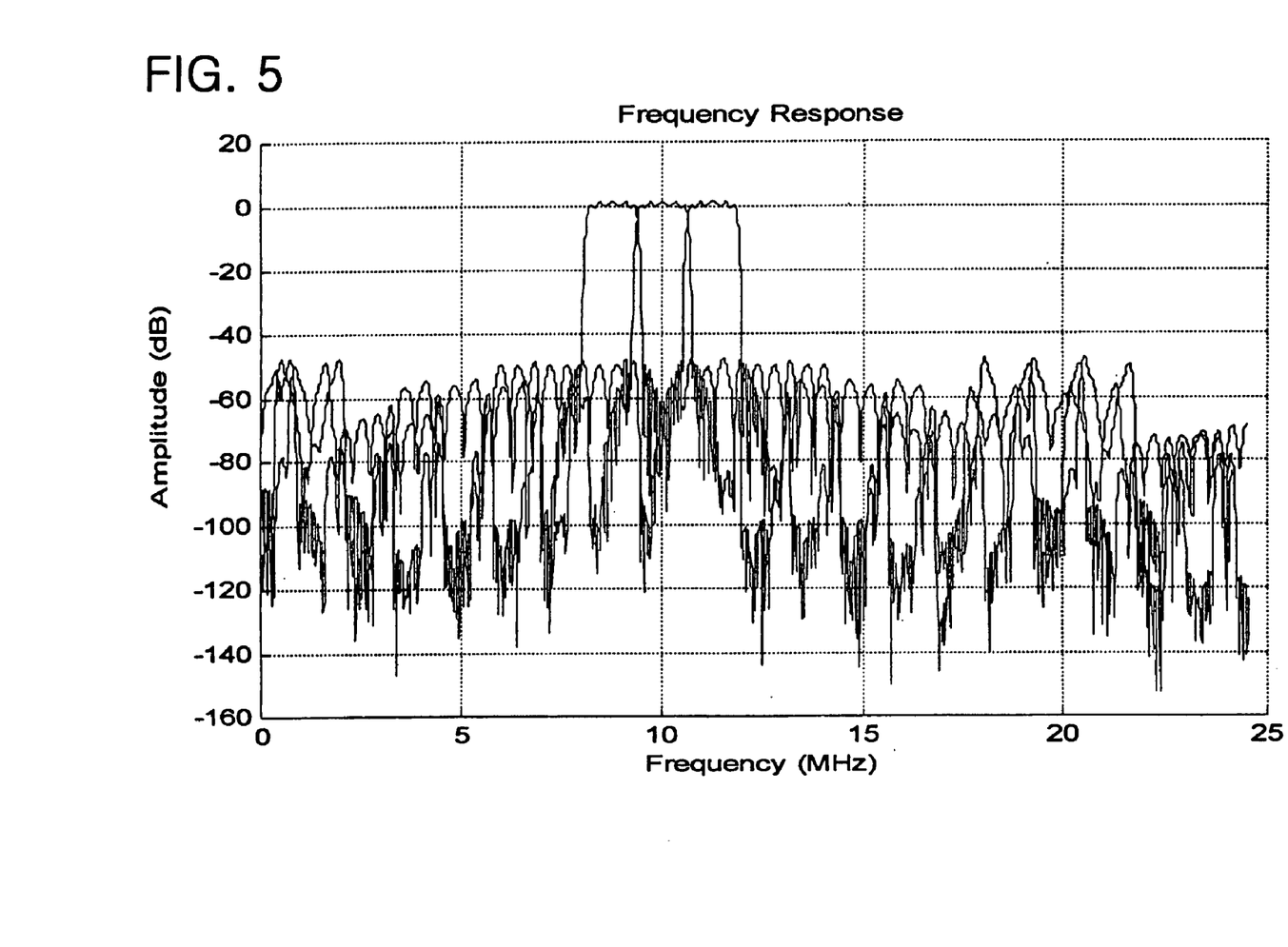
FIG. 5 is a waveform diagram illustrating the signal waveform of a frequency region when the digital modulated three frequency assignment signals are coupled.

FIG. 3 is a block diagram illustrating an RF transmitting device of a mobile radio communication base station system in a CDMA system according to a first embodiment of the present invention, FIG. 4 is an exemplary view illustrating the preferred embodiment of the plurality of digital modulators in FIG. 3, and FIG. 5 is a waveform diagram illustrating the signal waveform of a frequency region when the digital modulated three frequency assignment signals are coupled. In construction, the RF transmitting device according to the first embodiment of the present invention comprises a digital unit 100 for digital-modulating the baseband signals on the I/Q channels outputted from three channel cards 11, 12 and 13 by frequency assignment, coupling the digital-modulated signals by the frequency assignment, and then converting the coupled multi-frequency assignment digital modulated signal into an analog signal, an analog frequency up-converting unit 110 for primarily up-converting the analog-converted multi-frequency assignment signal in the digital unit 100 into an IF signal and for secondarily up-converting the converted IF signal into an RF signal, and a transmitting unit 90 for amplifying the RF signal outputted from the analog frequency up-converting unit 110 to an arbitrary transmitting output level and transmitting the amplified signal via an antenna. The digital unit 100 includes digital modulators 101, 102 and 103 for executing a QPSK modulation for the CDMA baseband signals outputted from the channel cards 11, 12 and 13 by the frequency assignment, a coupler 105 for coupling the three frequency assignment signals modulated respectively in the digital modulators 101, 102 and 103, and a D/A converter 104 for converting the coupled three frequency assignment QPSK modulated signal in the coupler 105 into the analog signal to thereby output the converted analog signal to the analog frequency up-converting unit 110.

Each of the digital modulators 101, 102 and 103 comprises, as shown in FIG. 4, low-pass filters a and a' for filtering the baseband signals on the I/Q channels outputted from the channel cards 11, 12 and 13 by the frequency assignment, interpolation filters c and c' for filtering the filtered baseband signals on the I/Q channels, a digital local oscillator b for outputting arbitrary local frequencies having the phase difference of 90°, mixers d and d' for mixing each of the local frequencies having the phase of 0° and 90° and each of the baseband signals on the I/Q channels which are sequentially passed through the low-pass filters a and a' and the interpolation filters c and c' and for executing the QPSK modulation for the output baseband signals, and an adder e for adding the QPSK modulated signals on the I and Q channels. The local frequencies generated from the digital local oscillator b within each of the digital modulators 101, 102 and 103 are generated at frequency assignment intervals, that is, the frequency of 1.25 MHz intervals. The analog frequency up-converting unit 110 comprises a first frequency up-converter 111 for up-converting the coupled three frequency assignment analog signal outputted from the D/A converter 104 of the digital unit 100 into an arbitrary IF signal, a band-pass filter 112 for filtering the coupled three frequency assignment IF signal outputted from the first frequency up-converter 111 to pass through only the frequency bandwidth of 3.75 MHz, and a second frequency up-converter 113 for converting the IF signal filtered in the band-pass filter 112 into an RF signal to thereby output the converted RF signal to the transmitting unit 90. In this case, the first frequency up-converter 111 includes a local oscillator for generating a fixed local frequency to thereby convert the analog signal outputted from the D/A converter 104 of the digital unit 100 into the IF signal. The band-pass filter 112 is an SAW filter having the bandwidth of 3.75 MHz, through which the coupled three frequency assignment IF signal is accurately passed. The reason why the bandwidth of 3.75 MHz is used is that the separated distance of each of the three frequency assignment is 1.25 MHz.

Now, an explanation of the operation of the RF transmitting device of the mobile radio communication base station system in the CDMA system according to the first embodiment of the present invention will be in detail discussed.

First, the channel cards 11, 12 and 13 by the three frequency assignment output the CDMA baseband signals on the I/Q channels to the digital modulators 101, 102 and 103 of the digital unit 100. The CDMA baseband signals on the I/Q channels are sequentially passed through the low-pass filters a and a' and the interpolation filters c and c', for their smooth digital modulation. Then, the QPSK modulation as a transmitting modulation for the filtered signals is carried out by the frequency assignment (0FA, 1FA and 2FA) and the modulated frequency assignment signals on the I/Q channels are added. In more detail, the baseband signals on the I/Q channels inputted to the digital modulators 101, 102 and 103 by the frequency assignment are passed through the low-pass filters a and a' and the interpolation filters c and c' within each of the digital modulators 101, 102 and 103. Then, the baseband signals on the I/Q channels are mixed to the local frequencies of 0° and 90° generated in the digital local oscillator b by means of the mixers d and d' and the QPSK modulation for each of the mixed baseband signals is carried out. Next, the modulated baseband signals on the I/Q channels are added at the adder e. At this time, the digital local oscillator b for generating the local frequency for the modulation has a channel selection function and the local frequency is generated at the frequency assignment intervals, i.e., the frequency intervals of 1.25 MHz. For example, in case where the digital local oscillator b of the digital modulator 101 in the frequency assignment 0FA uses the local frequency of 10 MHz, the digital local oscillator b of the digital modulator 102 in the frequency assignment 1FA uses the local frequency of 11.25 MHz and the digital local oscillator b of the digital modulator 103 in the frequency assignment 3FA uses the local frequency of 12.50 MHz.

The digital-modulated and added signals on the I/Q channels in the digital modulators 102, 103 and 104 by the frequency assignments are coupled by means of the coupler 105. In this case, the signal waveform on the frequency region obtained by coupling and simulating the digital-modulated three frequency assignment signals is shown in FIG. 4.

The coupled signal for the three frequency assignment 0FA, 1FA and 2FA is outputted to the D/A converter 104 and converted into the analog signal. The converted analog signal is outputted to the first frequency up-converter 111 of the analog frequency up-converting unit 110 and then converted into the IF signal. At this time, the local oscillator used for converting the inputted analog signal into the IF signal generates a fixed local frequency. Therefore, the converted IF signal in the first frequency up-converter 111 has a constant center frequency value having the band of the three frequency assignment. The converted IF signal in the first frequency up-converter 111 is passed through the band-pass filter 112, such that it can be protected from the harmonics and spurious generated during passing the mixer and the signal generated from the local oscillator. At this time, the band-pass filter 112 is, preferably, the SAW filter having the bandwidth of 3.75 MHz, in order to accurately pass the three frequency assignment coupled signal. Then, the filtered signal is outputted to the second frequency up-converter 113 and converted into the RF signal, thereby being outputted to the transmitting unit 90. At this time, in the same manner as the first frequency up-converter 111, the second frequency up-converter 113 includes the local oscillator for generating a fixed local frequency to convert the If signal into the RF signal. Therefore, the converted RF signal has a constant center frequency value having the band of the three frequency assignment. The converted RF signal in the second frequency up-converter 113 is amplified to a transmitting output signal of the base station in a low-power amplifier of the transmitting unit 90. Then, the bandwidth of the transmitting output signal is limited to prevent the affect on the frequency used in another communication system and the band-limited RF signal is then transmitted via the antenna.

Second Embodiment

Figure 6:
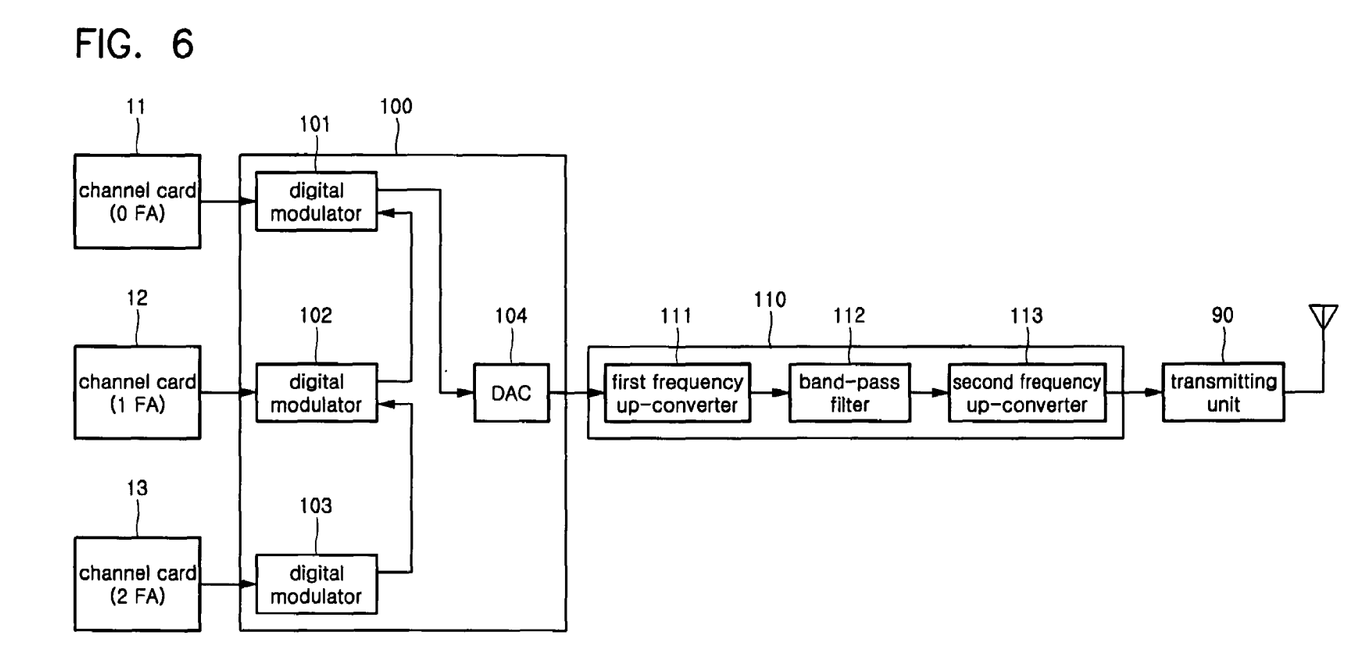
FIG. 6 is a block diagram illustrating an RF transmitting device of a mobile radio communication base station system in a CDMA system according to a second embodiment of the present invention.

FIG. 6 is a block diagram illustrating an RF transmitting device of a mobile radio communication base station system in a CDMA system according to a second embodiment of the present invention. On the other hand, an explanation of the same components as in the prior art of FIG. 1 and in the first embodiment of the present invention of FIG. 3 will be omitted for the brevity of the description.

Figure 7:
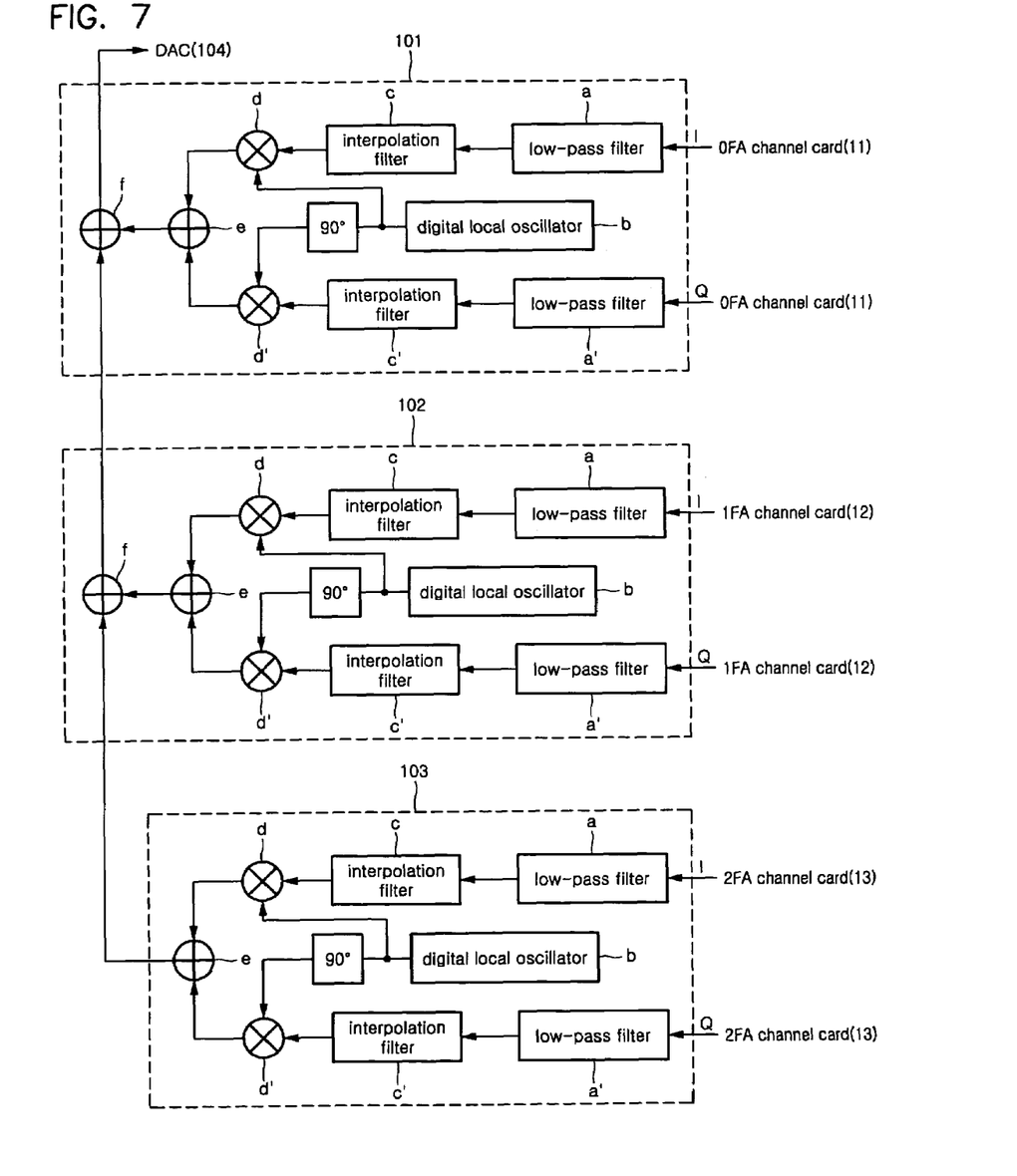
FIG. 7 is an exemplary view illustrating the preferred embodiment of the plurality of digital modulators in FIG. 6.

As shown, an RF transmitting device of a mobile radio communication base station system in a CDMA system according to the second embodiment of the present invention does not include the coupler 105 of the digital unit 100 in FIG. 3. In addition, the digital modulator 103 for the frequency assignment 2FA is configured in the same manner as in FIG. 4 and as shown in FIG. 7, the digital modulators 101 and 102 for the frequency assignment 0FA and 1FA are configured by adding an adder f in FIG. 4. In other words, the modulated signal in the adder e of the digital modulator 103 for the frequency assignment 2FA is outputted to the adder f in the digital modulator 102 for the frequency assignment 1FA and primarily coupled to the modulated and coupled signal in the I/Q channels in the adder e in the digital modulator 102 for the frequency assignment 1FA. Then, the primarily coupled signal (2FA+1FA) in the adder f of the digital modulator 102 for the frequency assignment 1FA is outputted to the adder f in the digital modulator 101 for the frequency assignment 0FA. Therefore, the adder f in the digital modulator 101 for the frequency assignment 0FA performs a secondary coupling of the primarily coupled signal for the frequency assignment 2FA and 1FA outputted from the adder f of the digital modulator 102 for the frequency assignment 1FA with the coupled signal on the I/Q channels for the frequency assignment 0FA outputted from the adder e of the digital modulator 101, thereby outputting the secondarily coupled signal (0FA+1FA+2FA) for each frequency assignment to the D/A converter 104.

Hereinafter, a brief explanation of the operation for the RF transmitting device in the mobile radio communication system of the CDMA system according to the first and second embodiments of the present invention will be discussed.

First, if the baseband signals on the I/Q channels for each frequency assignment are transmitted in the channel cards 101, 102 and 103, the digital modulators 101, 102 and 103 execute the digital modulation for the baseband signals for each FA. The modulated frequency signals for each frequency assignment are serial or parallel-coupled in the coupler 105. At this time, the digital local oscillator b for each frequency assignment used for the modulation in the digital modulators 101, 102 and 103 generates the local frequency at the frequency assignment intervals (1.25 MHz). Therefore, the up-converted digital signal can maintain the channel interval of the frequency assignment. The serial or parallel-coupled digital signal is converted into the analog signal in the D/A converter 104 and the converted analog signal is up-converted into the IF signal in the first frequency up-converter 111 of the analog frequency up-converting unit 110. The converted IF signal is filtered in the SAW filter 112 having the bandwidth of the 3.75 MHz and then applied to the second frequency up-converter 113, in which the filtered IF signal is up-converted into the RF signal. At this time, the local oscillator within the second frequency up-converter 113 generates the fixed local frequency, when compared with that in the prior art which generates different local frequencies for each frequency assignment. The converted RF signal in the second frequency up-converter 113 is applied to the transmitting unit 90 and amplified to a final output level in the transmitted terminal of the base station, thereby being transmitted through the antenna.

As clearly appreciated from the above, an RF transmitting device of a mobile radio communication base station system in a CDMA system according to the present invention is capable of digital-modulating baseband signals which are converted into band spread signals by using the same path which three frequency assignment frequency signals have for an RF in a multi-carrier mobile radio communication system supporting three frequency assignment, digital-coupling the modulated signals, and up-converting the digital-coupled signal into an IF signal and an RF signal in a sequential order, thereby transmitting the up-converted signal, whereby the digital region is extended up to the RF and the RF processing system operates stably relative to temperature and time.

Additionally, since the three frequency assignment frequency has the same path as an RF in the system supporting three frequency assignment, the whole base station system as well as the RF transmitting device are configured in a simple manner and thereby, the unnecessary cost consumption can be prevented.

Moreover, since the frequency assignment can be extended by three frequency assignment, the extension of the frequency assignment is carried out easily.

What is claimed is:

1. An RF transmitting device of a mobile radio communication base station system in a CDMA system having a plurality of channel cards providing baseband signals on I/Q channels for multi-frequency assignment and a transmitting antenna, said RF transmitting device comprising:
   a plurality of digital modulators for digital modulating the baseband signals on the I/Q channels to frequencies according to a frequency assignment, wherein the baseband signals are provided from said plurality of channel cards, wherein each of said digital modulators comprises a digital local oscillator for outputting one of a plurality of local frequencies, and a digital mixer for generating mixed signals by mixing the baseband signals on the I/Q channels with respective ones of the plurality of local frequencies;
   a digital adder for coupling the mixed signals;
   a digital to analog converter for converting the coupled mixed signals into an analog-converted multi-frequency signal;
   an analog frequency up-converting unit for up-converting the analog-converted multi-frequency signal in said digital unit into an IF signal and a secondarily up-converting the converted IF signal into an RF signal, wherein said analog frequency up-converting unit comprises a first frequency up-converter for up-converting the coupled multi-frequency assignment analog signal outputted from said digital unit into an arbitrary IF signal; a band-pass filter for band-pass filtering the coupled multi-frequency assignment IF signal outputted from said first frequency up-converter to an arbitrary frequency bandwidth; and a second frequency up-converter for converting the IF signal filtered in said band-pass filter into an RF signal to thereby output the converted RF signal to said transmitting unit, and wherein said band-pass filter is an SAW filter having the bandwidth of 3.75 MHz, in order to accurately pass the multi-frequency assignment coupled signal; and
   a transmitting unit for amplifying the secondarily up-converted RF signal to an arbitrary transmitting output level and transmitting the amplified signal via said transmitting antenna.

2. The RF transmitting device as claimed in claim 1, wherein each of said plurality of digital modulators comprises: a plurality of low-pass filters for low-pass filtering the baseband signals on the I/Q channels outputted from each of said plurality of channel cards by the frequency assignment; and a plurality of interpolation filters for filtering the low-pass filtered baseband signals on the I/Q channels.

3. The RF transmitting device as claimed in claim 2, wherein said local frequencies generated from said digital local oscillator within each of said plurality of digital modulators are generated at frequency assignment intervals, that is, the frequency of 1.25 MHz intervals.

4. The RF transmitting device as claimed in claim 1, wherein the modulated signals in said digital unit are coupled serially in the same manner that the modulated signal in the Nth digital modulator of said plurality of digital modulators is outputted to the N−1th digital modulator and primarily coupled to the modulated signal corresponding to the N−1th frequency assignment in the N−1th digital modulator, and the primarily coupled N+(N−1)th frequency assignment modulated signal is outputted to the N−2th digital modulator and secondarily coupled to the modulated signal corresponding to the N−2th frequency assignment in the N−2th digital modulator, whereby the secondarily coupled multi-frequency assignment modulated signal is outputted to said D/A converter.

5. The RF transmitting device as claimed in claim 1, wherein said first frequency up-converter comprises: a first local oscillator for generating a fixed local frequency to convert the analog signal inputted into the IF signal; and a first mixer for mixing the fixed local frequency signal generated from said first local oscillator and the analog signal inputted and converting the mixed result into the IF signal having a constant center frequency of the multi-frequency assignment band.

6. An RF transmitting device of a mobile radio communication base station system in a CDMA system having a plurality of channel cards providing baseband signals on I/Q channels for multi-frequency assignment and a transmitting antenna, said RF transmitting device comprising:
   a plurality of digital modulators for performing a QPSK modulation for each of the CDMA baseband signals outputted from the plurality of channel card by each frequency assignment, wherein each digital modulator comprises (i) a low-pass filter for low-pass filtering the baseband signals on the I/Q channels (ii) an interpolation filter for filtering the low-pass filtered baseband signals on the I/Q channels, (iii) a digital local oscillator for outputting local frequencies, (iv) a mixer for mixing each of the local frequencies from said local oscillator and each of the baseband signals on the I/Q channels which are sequentially passed through said low-pass filter and said interpolation filter;
   a coupler for coupling the digital modulated signals;
   a D/A converter for converting the coupled multi-frequency assignment QPSK modulated signal in said coupler into an analog signal and outputting the converted analog signal to an analog frequency up-converting unit;
   said analog frequency up-converting unit comprising a first frequency up-converter for converting the multi-frequency assignment analog modulated signal outputted from said D/A converter into an arbitrary IF signal, a SAW band-pass filter having the bandwidth of 3.75 MHz for filtering the up-converted multi-frequency assignment IF signal in said first frequency up-converter to an arbitrary bandwidth, and a second frequency up-converter for converting the filtered multi-frequency assignment IF signal in said band-pass filter into an RF signal to thereby output the converted RF signal to a transmitting unit; and said transmitting unit for amplifying the up-converted RF signal in said second frequency up-converter of said analog frequency up-converting unit to an arbitrary transmitting output level and transmitting the amplified signal via said transmitting antenna.

7. An RF transmitting device of a mobile radio communication base station system in a CDMA system having a plurality of channel cards providing baseband signals on I/Q channels for multi-frequency assignment and a transmitting antenna, said RF transmitting device comprising:

a plurality of digital modulators for executing a QPSK modulation for each of the CDMA baseband signals outputted by said plurality of channel cards and serially coupling the QPSK modulated signal in a most significant frequency assignment or a least significant frequency assignment with the QPSK modulated signal in a more significant frequency assignment or a less significant frequency assignment, in a sequential order, to thereby output a digital modulated signal in a multi-frequency assignment band, wherein each of said digital modulators comprises a digital local oscillator for outputting one of a plurality of local frequencies, and a digital mixer for generating mixed signals by mixing the baseband signals on the I/Q channels with respective ones of the plurality of local frequencies;

a coupler connected to the digital modulators for generating a coupled multi-frequency QPSK modulated signal;

a D/A converter for converting the coupled multi-frequency QPSK modulated signal outputted from the most significant frequency assignment or the least significant frequency assignment digital modulator into an analog signal to thereby output the converted analog signal to an analog frequency up-converting unit;

said analog frequency up-converting unit comprising a first frequency up-converter for up-converting the coupled multi-frequency assignment analog signal outputted from said D/A converter into an arbitrary IF signal, a SAW band-pass filter having the bandwidth of 3.75 MHz, for band-pass filtering the coupled multi-frequency assignment IF signal outputted from said first frequency up-converter to an arbitrary bandwidth, and a second frequency up-converter for converting the multi-frequency assignment IF signal filtered in said band-pass filter into an RF signal to thereby output the converted RF signal to a transmitting unit; and said transmitting unit for amplifying the up-converted RF signal in said second frequency up-converter of said analog frequency up-converting unit to an arbitrary transmitting output level and transmitting the amplified signal via said transmitting antenna.

8. The RF transmitting device as claimed in claim 1, wherein said second frequency up-converter comprises: a second local oscillator for generating a fixed local frequency to convert the filtered IF signal inputted into the RF signal; and a second mixer for mixing the fixed local frequency signal generated from said second local oscillator and the IF signal and converting the mixed result into the RF signal having a constant center frequency of the multi-frequency assignment band.

* * * * *